United States Patent [19]
Shihoh

[11] Patent Number: 5,841,756
[45] Date of Patent: Nov. 24, 1998

[54] CARTRIDGE AUTO-CHANGER CAPABLE OF INTERCHANGING A CARTRIDGE

[75] Inventor: Makoto Shihoh, Yokohama, Japan

[73] Assignee: Canon Kabushiki Kaisha, Tokyo, Japan

[21] Appl. No.: 638,502

[22] Filed: Apr. 26, 1996

[30] Foreign Application Priority Data

May 1, 1995 [JP] Japan .................................... 7-107478
May 1, 1995 [JP] Japan .................................... 7-107484

[51] Int. Cl.$^6$ .................................................. G11B 15/68
[52] U.S. Cl. ............................................................ 369/192
[58] Field of Search ..................................... 369/192, 191, 369/178, 34, 36, 77.1, 75.2; 360/92; 414/281, 277

[56] References Cited

U.S. PATENT DOCUMENTS

| | | | |
|---|---|---|---|
| 5,502,697 | 3/1996 | Taki | 369/34 |
| 5,544,148 | 8/1996 | Nakamichi | 369/77.1 |
| 5,570,337 | 10/1996 | Dang | 369/192 |

*Primary Examiner*—Allen T. Cao
*Attorney, Agent, or Firm*—Fitzpatrick, Cella, Harper & Scinto

[57] ABSTRACT

A cartridge auto-changer includes a containing shelf containing a plurality of cartridges therein, a recording-reproducing apparatus for effecting recording and/or reproduction on recording media in the cartridges, a slot for loading the cartridges therethrough from the outside of the auto-changer into the auto-changer, a conveying mechanism for conveying the cartridges between the containing shelf and the slot and between the slot and the recording-reproducing apparatus, and a stopping mechanism for stopping the cartridges inserted through the slot on the conveyance route between the slot and the receiving position of the conveying mechanism for the cartridges.

3 Claims, 10 Drawing Sheets

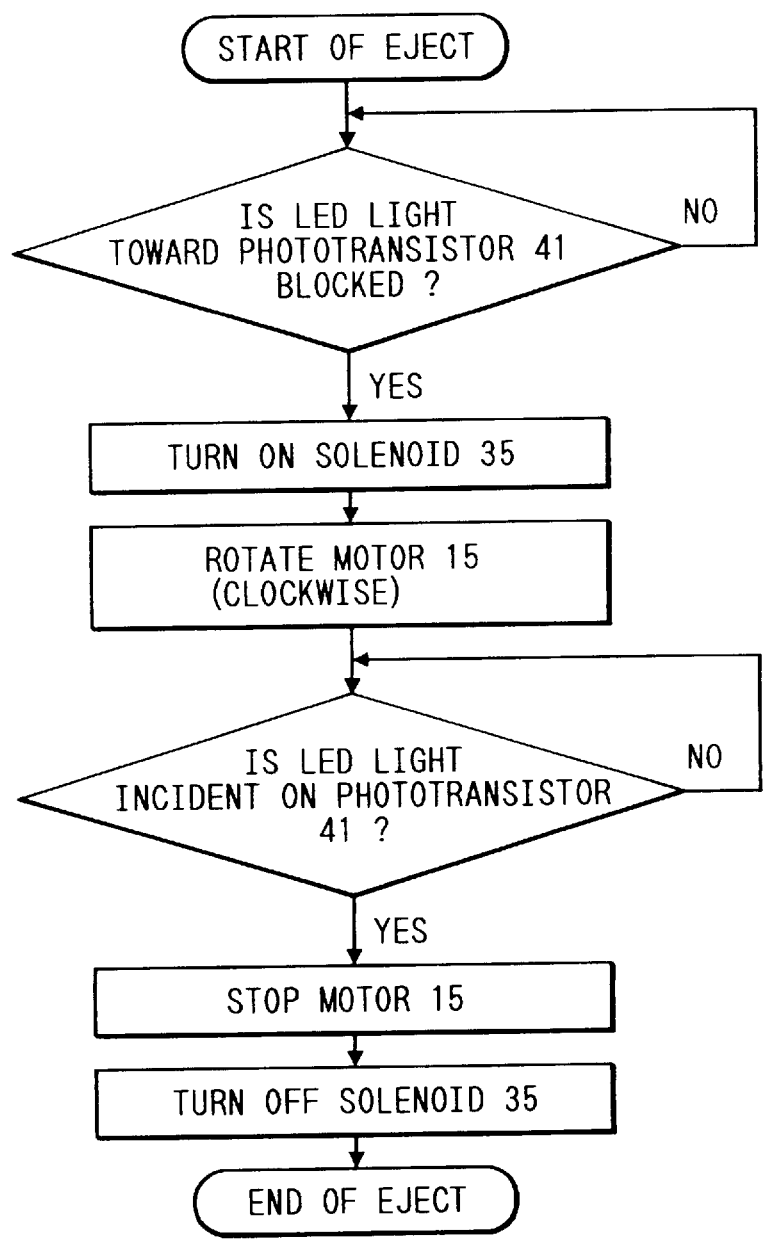

CARTRIDGE AUTO-CHANGER CAPABLE OF INTERCHANGING A CARTRIDGE

BACKGROUND OF THE INVENTION

1. Field of the Invention

This invention relates to a cartridge auto-changer having a magazine containing therein a plurality of cartridges containing therein disc-like recording mediums such as magneto-optical discs or tape-like and card-like recording mediums, taking out a desired cartridge from among the cartridges contained in said magazine, loading it into a recording-reproducing apparatus and executing recording and/or reproduction.

2. Description of the Related Art

As a cartridge auto-changer, there has heretofore been one as shown, for example, in FIG. 1 of the accompanying drawings which is used for the recording and/or reproduction on disc-like recording mediums (in this case, optical discs). In FIG. 1, a recording-reproducing apparatus 202 is provided in an auto-changer 201, a fixed type magazine (not shown) is disposed in the upper portion thereof, and a plurality of disc cartridges 203 containing said recording mediums therein are arranged parallel to one another in the direction of thickness of the recording mediums and contained in the magazine.

Reference numeral 204 designates conveying means for conveying the individual cartridges, 203 on a carriage between the recording-reproducing apparatus 202 and the magazine. The conveying means 204 can be moved in a vertical direction (the direction of the arrows in FIG. 1) by suitable driving means. That is, when it is desired to reproduce the information of a recording medium, for example, in the sixth cartridge from the bottom, the conveying means 204 is moved to a position corresponding to the sixth cartridge from the bottom, as shown in FIG. 1, and a desired cartridge in the magazine is carried onto the conveying means by cartridge mounting-dismounting means (not shown).

Subsequently, the conveying means 204 thus carrying the cartridge thereon is moved downward and stopped at a position corresponding to the cartridge loading port of the recording-reproducing apparatus 202. Thereafter, the cartridge is inserted from the conveying means 204 into the recording-reproducing apparatus 202, and the information of an optical disc therein is reproduced. When the information of another disc is to be reproduced, the aforementioned cartridge is returned from the recording-reproducing apparatus 202 onto the conveying means, which is then moved in the converse route and returned to its original position in the magazine, after which a similar conveying operation is entered for a newly selected cartridge.

In the cartridge auto-changer of such a construction, when the cartridges in the magazine are to be added, a desired cartridge is loaded from the loading port 205 of the auto-changer 201 onto the conveying means 204, and then the conveying means 204 is moved to a position corresponding to a cartridge-vacant area in the magazine, and the cartridge is loaded into the magazine by the cartridge mounting-dismounting means.

When a desired cartridge in the magazine is to be interchanged, an unnecessary cartridge is taken out onto the conveying means 204 by the cartridge mounting-dismounting means, and the conveying means is moved to the loading port 205 and the unnecessary cartridge is discharged from the loading port 205. Thereafter, as previously described, a new cartridge can be inserted into the auto-changer.

Accordingly, when cartridges (recording mediums) in the magazine are to be interchanged with new cartridges (recording mediums having discrete recorded information), there is required the procedure of discharging unnecessary cartridges one by one from the magazine, and thereafter inserting new cartridges corresponding thereto one by one, and when it is desired to interchange several cartridges collectively at a time, this operation must be repeated, and this leads to the disadvantage that the work is cumbersome and much time is required.

So, recently, there has been proposed an auto-changer having a magazine made removably mountable and capable of interchanging cartridges together with the magazine. If cartridges can be interchanged together with the magazine, the work of interchanging a plurality of cartridges can be done within a short time and simply. Also, the custody of cartridges in the unit of the magazine can be done and therefore, it is convenient to pigeonhole a great deal of disc cartridges. Provision is also made of a slot for a single cartridge for an operator, when he desires to reproduce other cartridge than the cartridges in the magazine in an interrupting manner by a recording-reproducing apparatus, to insert that cartridge.

In such an auto-changer, a lockable shutter is usually provided at the entrance to the slot for a single cartridge because when a cartridge is inserted through the slot for a single cartridge during the operation of the auto-changer such as the conveyance of a cartridge between the magazine and the recording-reproducing apparatus, it causes a problem. Accordingly, when it is inconvenient that a cartridge is inserted in an interrupting manner, the entrance to the slot for a single cartridge is closed by the aforementioned shutter so that an operator cannot insert a cartridge by mistake.

According to such a construction, however, when the shutter is being locked, a cartridge to be reproduced cannot be inserted and therefore, the operator must be monitoring when this shutter is unlocked, and this is very cumbersome.

Further, a drive force generating source such as a solenoid or a motor unavoidably becomes necessary for a lock mechanism for the aforementioned shutter, and this unavoidably leads to an increased cost.

SUMMARY OF THE INVENTION

The present invention has been made in view of the above-noted circumstances and a first object thereof is to provide a cartridge auto-changer which, even during its operation, enables a cartridge to be inserted into a slot for a single cartridge without the operation of the auto-changer being hampered and enables the cartridge to wait in that position.

A second object of the present invention is to provide a cartridge auto-changer provided with means for inhibiting the insertion of a cartridge from a slot for a single cartridge into a recording-reproducing apparatus without a drive force generating source being discretely provided.

A third object of the present invention is to provide a cartridge auto-changer having means capable of reliably inhibiting the insertion of a cartridge from a slot for a single cartridge into a recording-reproducing apparatus by a simple construction.

The above objects are achieved by a cartridge auto-changer provided with:

a containing shelf containing a plurality of cartridges therein;

a recording-reproducing apparatus for effecting recording and/or reproduction on recording mediums in said cartridges;

a slot for loading said cartridges therethrough from the outside of said auto-changer into said auto-changer;

conveying means for conveying said cartridges between said containing shelf and said recording-reproducing apparatus and between said slot and said recording-reproducing apparatus; and means for stopping the cartridges inserted through said slot on the conveyance route between said slot and the receiving position of said conveying means for said cartridges.

The invention will hereinafter be described in detail with respect to an embodiment thereof.

BRIEF DESCRIPTION OF THE DRAWINGS

FIG. 11 is a flow chart showing the ejection of a cartridge.

DESCRIPTION OF THE PREFERRED EMBODIMENTS

Figure 5:
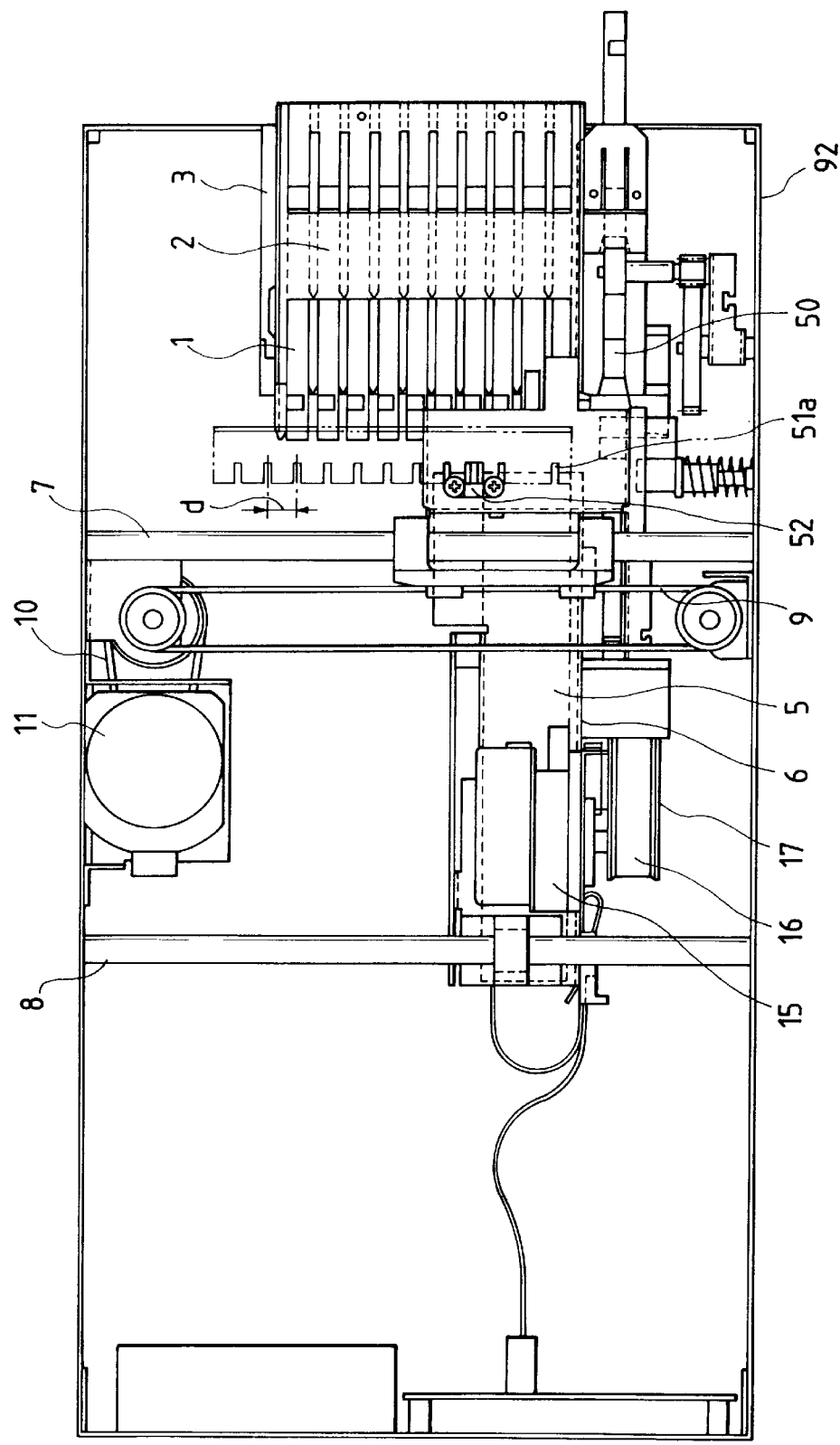
FIG. 5 is a plan view of the embodiment.

An embodiment of the present invention will hereinafter be described in detail with reference to the drawings. As depicted in FIG. 5, in the auto-changer of the present invention, a magazine 2 containing a plurality of cartridges 1 therein is fixed to a chassis 4 through a magazine base 3. In the present embodiment, ten cartridges are arranged and contained in the magazine 2 with a predetermined pitch d in the direction of thickness of recording mediums. Also, a movable portion 6 including a recording-reproducing apparatus 5 (hereinafter referred to as the drive apparatus 5) is constructed so as to be movable in the direction of thickness of the recording mediums. The movable portion 6 is guided along guide rails 7 and 8 having their opposite ends supported by the chassis 4, and receives a drive force from a motor 11 through timing belts 9 and 10.

A slot 50 for a single cartridge is provided adjacent to the magazine containing portion of the magazine base 3 to load a cartridge into the drive apparatus 5 directly from the outside of the auto-changer, discretely from the magazine 2.

Figure 7:
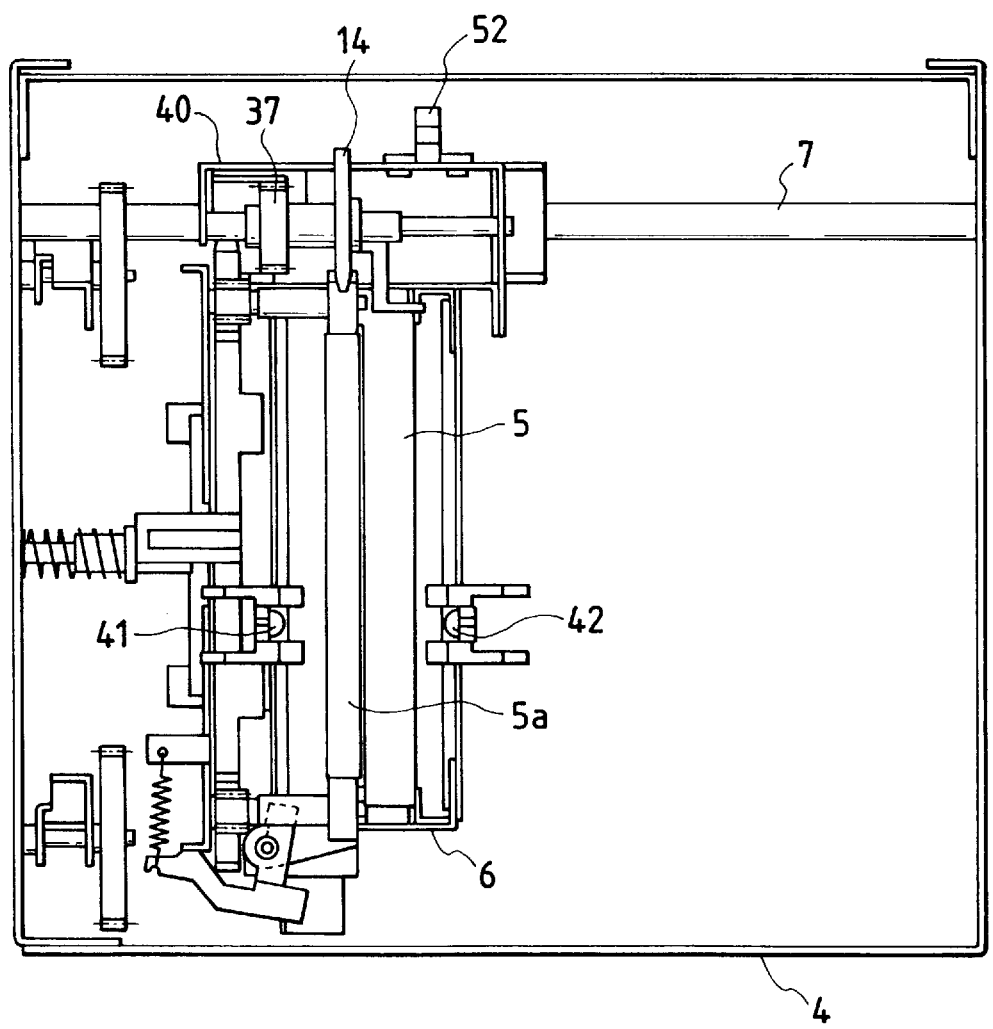
FIG. 7 is a plan view showing a slot for a single cartridge.

A slit plate 51 and a photointerrupter 52 are provided to position the cartridge loading port 5a (see FIG. 7) of the drive apparatus 5 at a location corresponding to the ten cartridges in the magazine and the slot 50. The slit plate 51 is fixed to the chassis 4 and is provided with slits corresponding to the number (in this embodiment, ten) of the cartridges 1 contained in the magazine and a slit 51a for the slot 50 correspondingly to the aforementioned pitch d. The photointerrupter 52 is provided on the upper portion of a bracket 40 supported by the movable portion 6, and the movable portion 6 is moved in such a manner that the gap of the photointerrupter 52 (a gap formed between an LED and a sensor opposed thereto) embraces the slit portion of the slit plate 51. When the center of the optical axis between the LED and sensor of the photointerrupter 52 has come onto a predetermined slit, if the movable portion 6 is stopped on the basis of the detection signal thereof, the cartridge loading port 5a of the drive apparatus 5 can be brought into coincidence with a required cartridge.

The cartridges 1 contained in the magazine 2 are conveyed to the drive apparatus 5, and conveying mechanisms for these cartridges are all carried on the movable portion 6. Means for conveying the cartridges is comprised of feed rollers 12, 13 for drawing the cartridges 1 out of the magazine 2 and inserting them halfway into of the drive apparatus 5, and a push-in lever 14 for loading the cartridges 1 conveyed to halfway by the feed rollers 12, 13 fully into the drive apparatus 5. Each of the feed rollers is provided with antislipping rubber on the peripheral surface thereof.

The drive of the feed rollers 12, 13 and the push-in lever 14 is given from a motor 15. The drive force of the motor 15 is transmitted through a timing belt 16 to a pulley 17, and is further transmitted to a gear 21 through a gear 18 integral with the pulley 17, a gear 19 and a gear 20 integral with the gear 19. A gear 22 has the same number of teeth as the gear 21 and is in meshing engagement with the latter gear, and is disposed at a location symmetrical with the gear 21 with respect to the vertical center line 23 of the cartridge 1 in FIG. 4.

Feed roller operating plates 24 and 25 are supported for pivotal movement about the rotary shafts 26 and 27, respectively, of the gears 21 and 22. Partial gears 28 and 29 having pitch circles of the same radius centering around the rotary shafts 26 and 27 are fixed to the feed roller operating plates 24 and 25, respectively, in a mutually meshing state. The partial gears 28 and 29 are in meshing engagement with each other so that the feed rollers 12 and 13 may be moved toward and away from each other at positions vertically symmetrical with respect to the center line 23 by the rotation of the two gears. Thus, by these partial gears 28 and 29, one of the plates 24 and 25 is pivotally moved and the other plate is pivotally moved by the same angle in the opposite direction.

On the other hand, the drive force transmitted to the gear 21 is transmitted to a gear 30 and a roller gear 32 rotatably about rotary shafts studded in the plate 24, and is further transmitted to the feed roller 12 mounted on an end of the roller gear 32. Likewise, the drive force transmitted to the gear 22 is transmitted to a gear 31 and a roller gear 33 rotatable about rotary shafts studded in the plate 25, and is further transmitted to the feed roller 13 mounted on an end of the roller gear 33. The gears 30 and 31 and the roller gears 32 and 33 are gears of the same module and of the same number of teeth.

Figure 6:
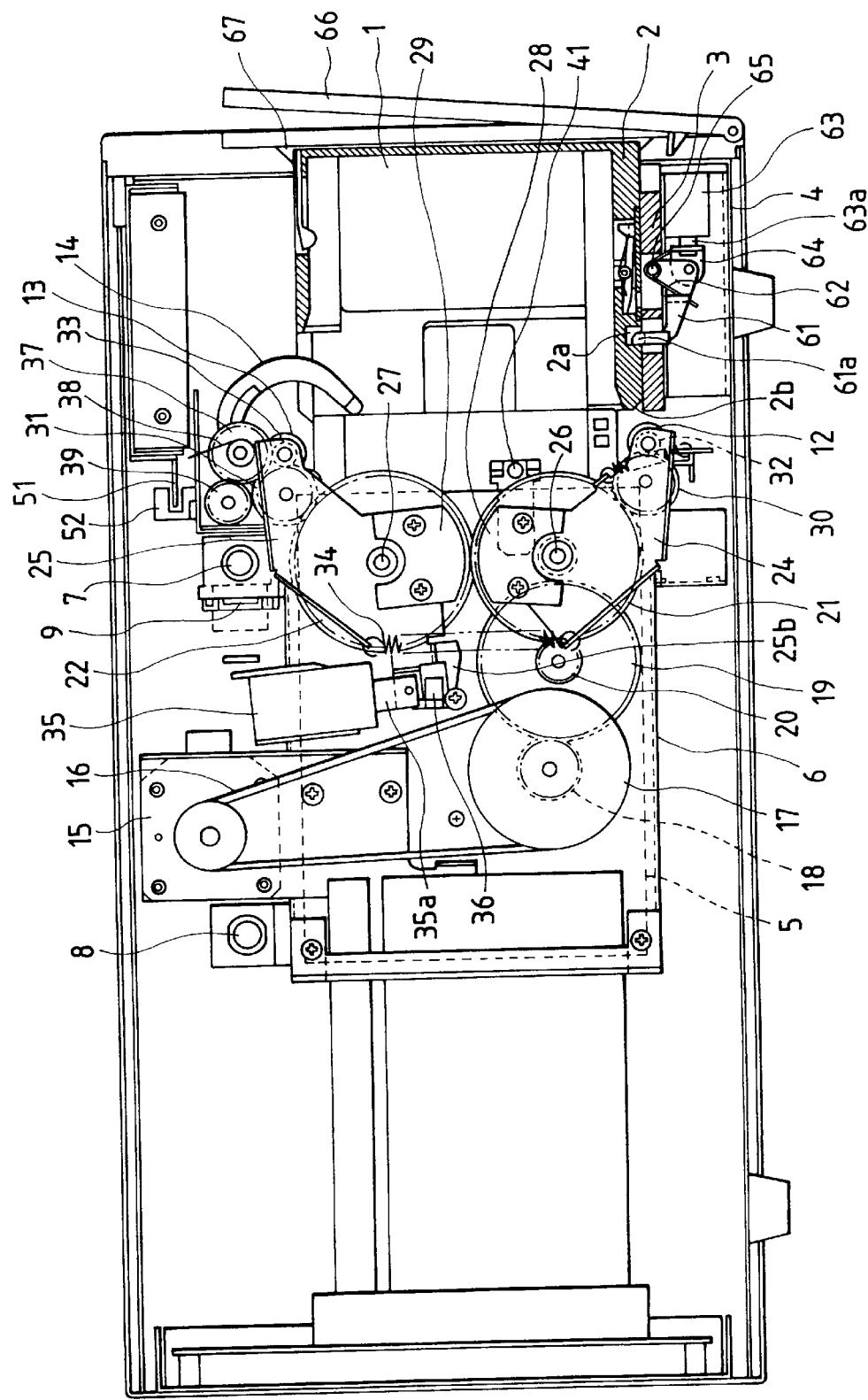
FIG. 6 is also a side view showing the process of loading of a cartridge into a drive apparatus.

By such a construction, the feed rollers 12 and 13 can be rotated in opposite directions and at quite the same rotational speed. Reference numeral 34 designates a tension spring which biases the plates 24 and 25 clockwisely and counterclockwisely, respectively. Therefore, the feed rollers 12 and 13 are normally spaced apart vertically from each other, as shown in FIG. 6, and are separated from both widthwise sides of the cartridge 1. Accordingly, if in this state, the movable portion 6 is moved, the cartridge will not hamper the movement of the movable portion.

Reference numeral 35 denotes a solenoid fixed to the movable portion 6. The iron core 35a of the solenoid 35 is connected to one end 25a of the plate 25, and by this solenoid 35 being electrically energized, the plate 25 is pivotally moved clockwisely and the plate 24 is pivotally moved counter-clockwisely.

Further, reference numeral 36 designates a photointerrupter for detecting the position of the plate 25, and the photointerrupter 36 is designed such that a portion 25b of the plate 25 comes into the gap of the photointerrupter for light interception.

A driving mechanism for the push-in lever will now be described. The push-in lever 14 is constructed integrally with a gear 37 and is biased counter-clockwisely by a torsion spring 38. The gear 37 is in meshing engagement with a gear 39, and both of the gears 37 and 39 are rotatably supported on a bracket 40.

Figure 4:
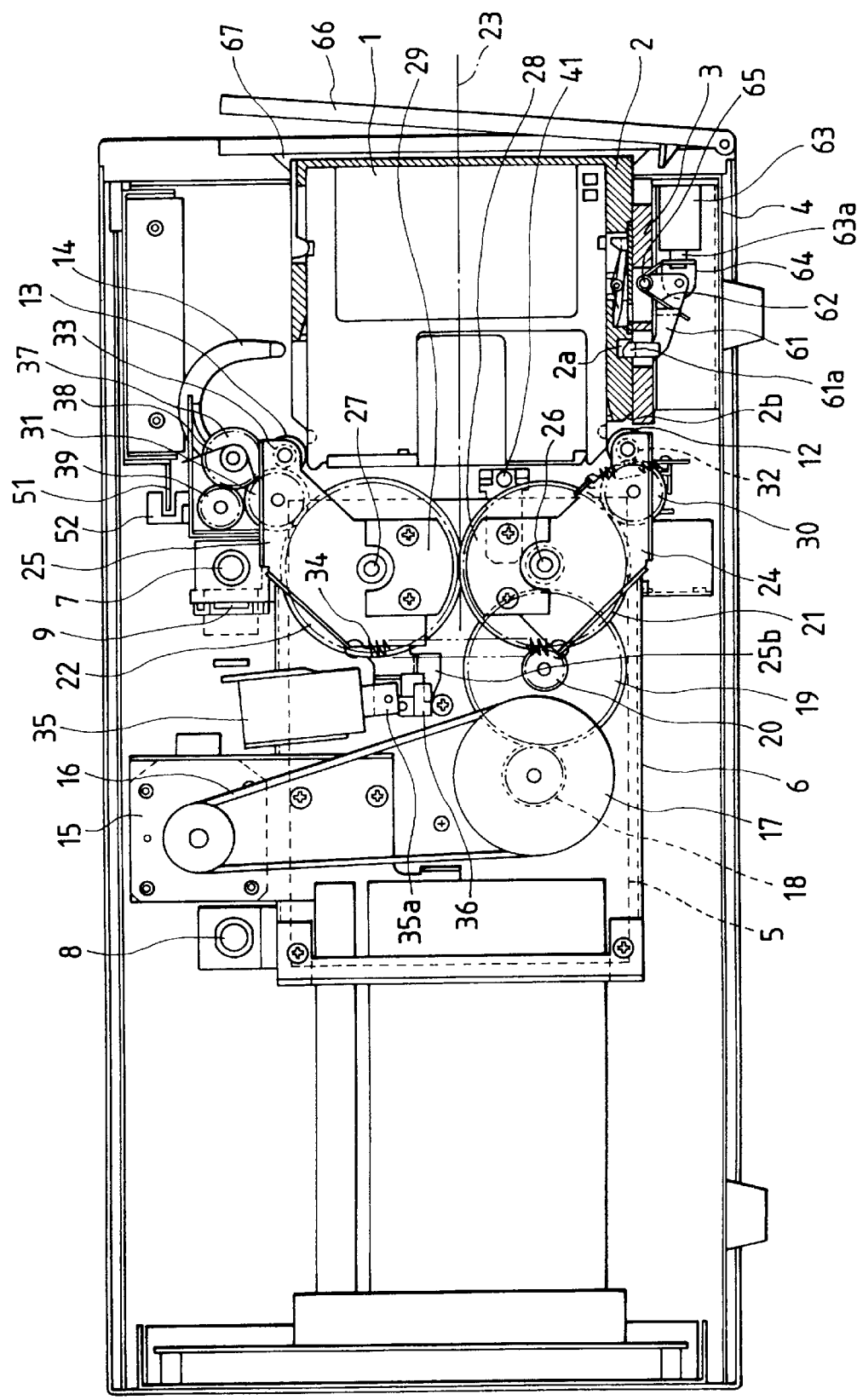
FIG. 4 is also a side view showing a state in which a cartridge is taken out of a magazine.

When as shown in FIG. 4, the solenoid 35 is being electrically energized, the feed rollers 12 and 13 are moved in directions to sandwich the cartridge 1 therebetween and therefore, the teeth of the gear 31 and the gear 39 do not mesh with one another and even if the motor 15 is rotated, the drive force thereof will not be transmitted to the push-in lever 14. However, when as shown in FIG. 6, the solenoid is electrically deenergized, the gears 31 and 39 come into meshing engagement with each other and therefore, if the motor 15 is rotated, the push-in lever 14 will also be rotated. At this time, the feed rollers 12 and 13 are also rotated, but they are only idly rotated because they are not in contact with the cartridge 1.

Reference numeral 41 denotes a phototransistor provided on the movable portion 6. The phototransistor 41 is used in a pair with an LED 42 (see FIG. 7) disposed on the movable portion in opposed relationship with the phototransistor with the drive apparatus 5 interposed therebetween. The LED 42 continuously emits light, and usually this light is received by the phototransistor 41, but in the process of loading or taking out of the cartridge with respect to the drive apparatus 5, the light is intercepted by the cartridge 1 and therefore, this state can be detected.

Figure 10:
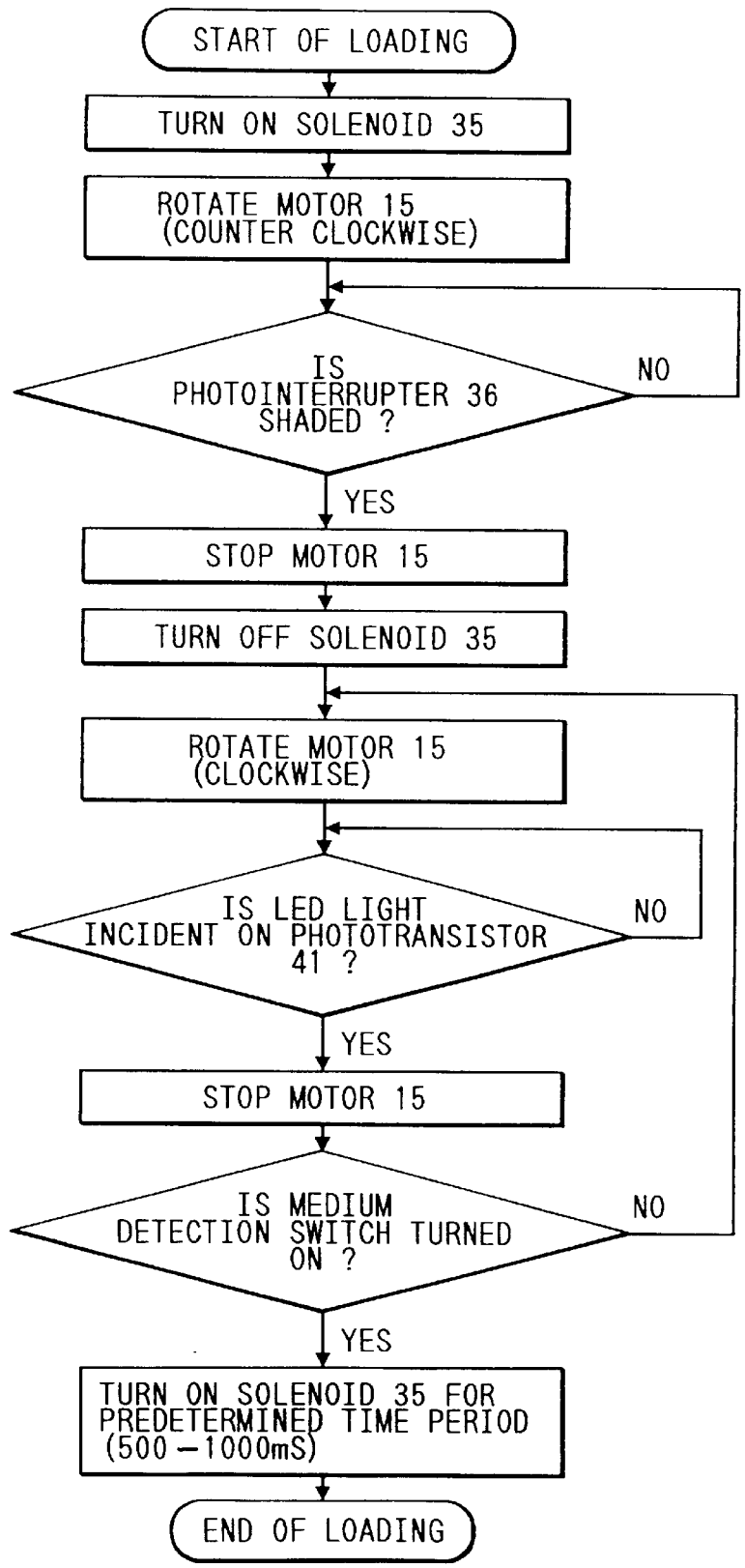
FIG. 10 is a flow chart showing the loading of a cartridge.

When the loading port 5a of the drive apparatus 5 is brought to a position corresponding to a desired cartridge 1, this cartridge 1 is first conveyed by the feed rollers 12 and 13. The feed rollers 12 and 13 are normally in the positions indicated in FIG. 6 and are separated from the widthwise sides of the cartridge 1. Accordingly, the cartridge does not hamper the movement of the movable portion 6. However, when a command for loading the cartridge into the drive apparatus 5 is outputted from control means, the loading of the cartridge into the drive apparatus is done in accordance with a flow shown in FIG. 10.

That is, the solenoid 35 is first electrically energized. At this time, a force greater than the biasing force of the tension spring 34 is created in the solenoid 35 and therefore, the feed roller 12 is rotated about the rotary shaft 26 and the feed roller 13 is rotated about the rotary shaft 27, and they roll into contact with the sides of the cartridge 1. When the motor 15 is then rotated counter-clockwisely, the drive force thereof is transmitted in the order of the timing belt 16, the pulley 17, the gears 18, 19, 20, 21, 30 and the roller gear 32. At the same time, the drive force is transmitted from the gear 21 to the gears 22, 31 and the roller gear 33 in the named order. Consequently, the feed roller 12 is rotated counter-clockwisely and the feed roller 13 is rotated clockwisely, whereby the disc cartridge 1 is conveyed into the drive apparatus 5.

The feed rollers 12 and 13 are pulled toward the cartridge by the solenoid 35 and therefore, when the conveyance of the cartridge 1 is ended, the feed rollers are further moved inwardly while being in contact with the trailing end of the cartridge, and begin to be idly rotated. At this time, a portion 25b of the plate 25 shades the space between the light source and sensor of the photointerrupter 36 for the first time, and by this detection signal, the driving of the motor 15 is stopped and the solenoid 35 is electrically deenergized. When the solenoid 35 is electrically deenergized, as shown in FIG. 6, the gear 31 is also rotated counter-clockwisely about the rotary shaft 27 and comes into meshing engagement with the gear 39 because the plate 25 is biased counter-clockwisely. So, when the motor 15 is now rotated clockwisely, the drive force thereof is transmitted to the gear 37 via the gears 31 and 39, whereby the push-in lever 14 is rotated clockwisely and pushes the trailing end of the cartridge 1. When the disc cartridge 1 is pushed in all the way, the disc cartridge 1 is locked in the drive apparatus 5 and is held in its operative position.

During the conveyance of the cartridge 1, the LED light incident on the phototransistor 41 is intercepted by the cartridge 1, but when the cartridge 1 is pushed in all the way, the LED light arrives at the phototransistor 41. Accordingly, this is detected and the motor 15 is once stopped, that is, the drive to the push-in lever 14 is stopped. At this point of time, whether a medium detection switch (not shown) in the drive apparatus 5 is closed is examined, and if it should still be in its OFF state, the motor 15 is again driven until the switch becomes ON.

If without the use of the phototransistor 41, the drive stop period of the push-in lever 14 is determined by the medium detection switch alone, the timing for stopping the motor 15 will become late and an excessive load will be applied to the motor and the drive force transmitting system, thus causing a problem. Accordingly, it is preferable to adopt the sequence as previously described.

Subsequently, the solenoid 35 is electrically energized for a predetermined time (e.g. 500 mS–1000 mS). By this operation, the meshing engagement between the gear 31 and the gear 39 is released and by the force of restitution of the torsion spring 38, the push-in lever 14 is returned to its original position and the loading operation ends.

According to the construction described above, the feed rollers 12 and 13 are also rotated during the driving of the push-in lever 14, but this does not particularly pose any problem.

Description will now be made of the operation when the disc cartridge 1 is returned into the magazine 2 in accordance with a flow shown in FIG. 11. When a cartridge discharging command to the drive apparatus 5 is outputted from the control means, the cartridge 1 is discharged from the cartridge loading port 5a of the drive apparatus 5. When the discharge of the cartridge 1 is detected by the LED light to the phototransistor 41 being intercepted, the solenoid 36 is electrically energized to bring the feed rollers 12 and 13 into rolling contact with the sides of the cartridge 1. The motor 15 is then rotated clockwisely and the feed rollers 12 and 13 are rotated clockwisely and counter-clockwisely, respectively, thereby starting the conveyance of the cartridge 1 to the magazine.

The termination of the conveyance of the disc cartridge 1 into the magazine 2 is detected by the phototransistor 41. When the reception of the disc cartridge 1 into the magazine 2 is completed, the light of the LED 42 so far intercepted again arrives at the phototransistor 41 and therefore, by this being detected, the motor 15 and the solenoid 36 are electrically deenergized.

A mechanism for loading a cartridge inserted through the slot 50 for a single cartridge into the drive apparatus 5 will now be described with reference to FIG. 8. The cartridge 1 inserted from the front of the auto-changer is at last conveyed by the feed rollers 12, 13 and the push-in lever 14, but as shown in FIG. 8, it is conveyed to a position in which the sides of the cartridge 1 come into contact with the feed rollers 12 and 13, by another set of feed rollers 71 and 72.

Figure 8:
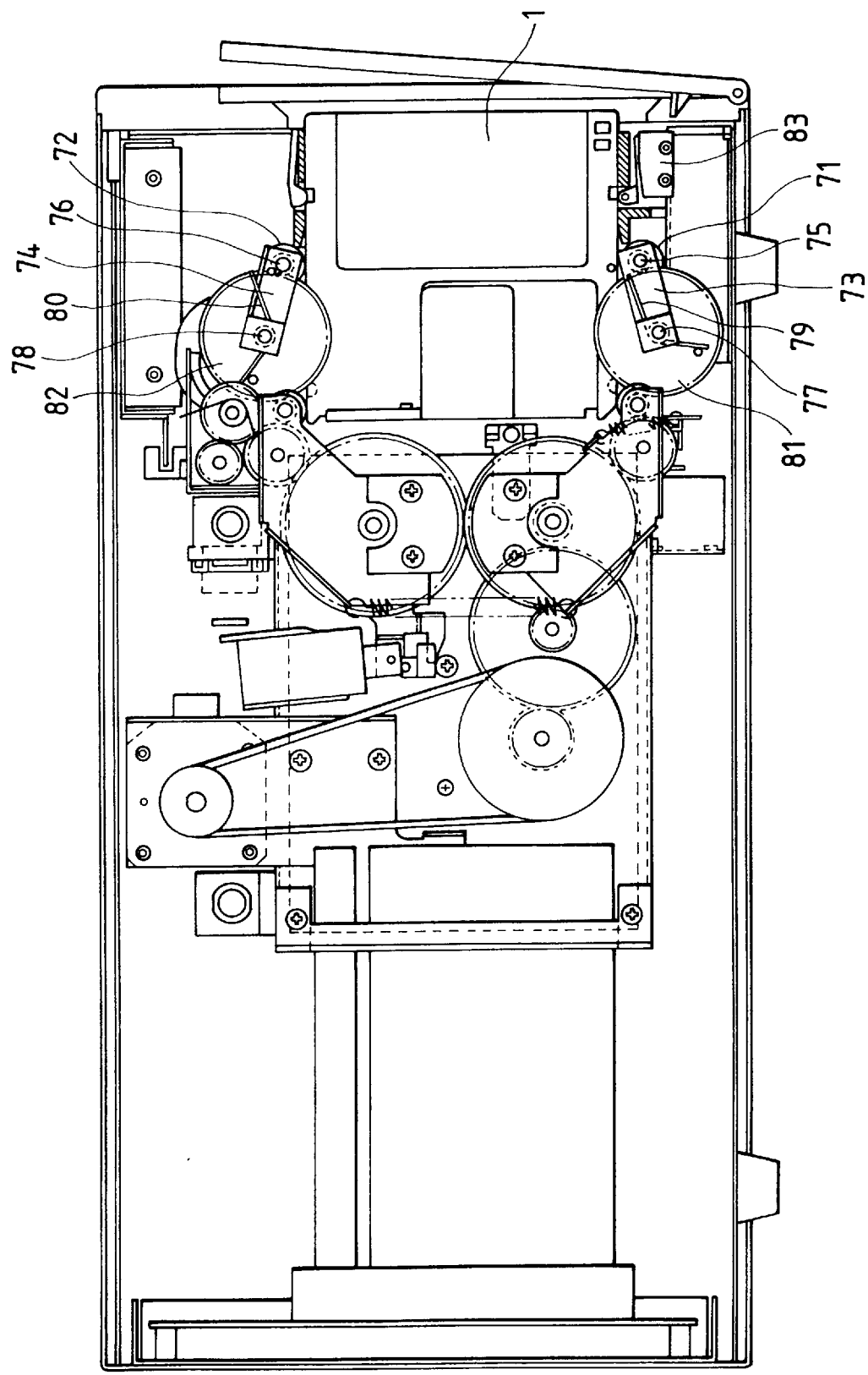
FIG. 8 is a side view showing a state in which a cartridge is taken out from the slot.

The feed rollers 71 and 72 are mounted on the ends of roller gears 75 and 76 rotatably provided on roller bases 73 and 74, which in turn are supported for rotation about rotary shafts 77 and 78 studded in a left chassis (not shown) located on this side as viewed in FIG. 8 and are biased in directions to urge the feed rollers 71 and 72 against the sides of the cartridge 1 by torsion springs 79 and 80. Gears 81 and 82 are gears supported for rotation about the rotary shafts 77 and 78 independently of the roller bases 73 and 74, and are in meshing engagement with the roller gears 75 and 76, respectively. Reference numeral 83 designates a microswitch for detecting whether there is a cartridge 1 in the slot 50.

The gears 81 and 82 are designed to come into meshing engagement with the roller gears 32 and 33 only when the cartridge loading port 5a (see FIG. 7) of the drive apparatus 5 has come to a position corresponding to the slot 50 for a single cartridge and the solenoid 35 is in its ON state and the plates 24 and 25 have moved inwardly.

When the insertion of the cartridge into the slot 50 is detected by the microswitch 83, the loading port 5a of the drive apparatus 5 is moved to a position corresponding to the slot 50. When the solenoid 35 is electrically energized and the motor 15 is driven so as to rotate counter-clockwisely, the feed roller 71 is rotated in the same direction as the feed roller 12 and the feed roller 72 is rotated in the same direction as the feed roller 13 to thereby convey the cartridge toward the drive apparatus. When as shown in FIG. 8, the cartridge is conveyed to a position in which the sides thereof come into contact with the feed rollers 12 and 13, the cartridge is thereafter loaded into the drive apparatus as in the above-described conveyance of the cartridge in the magazine.

The cartridge discharged from the drive apparatus is initially conveyed to the slot 50 by the feed rollers 12 and 13, whereafter it is conveyed by the feed rollers 71 and 72 and is stopped at a stage where a portion of the cartridge has come out of the auto-changer. It is detected that the light of the LED 42 so far intercepted has again arrived at the phototransistor 41, whereby the motor 15 and the solenoid 36 are electrically deenergized and thus, the cartridge 1 can be made to wait in the slot 50. It also becomes possible to exchange the cartridges contained in the magazine 2 with new ones by the use of the fact that the cartridge is made to wait in the slot 50.

Figure 9:
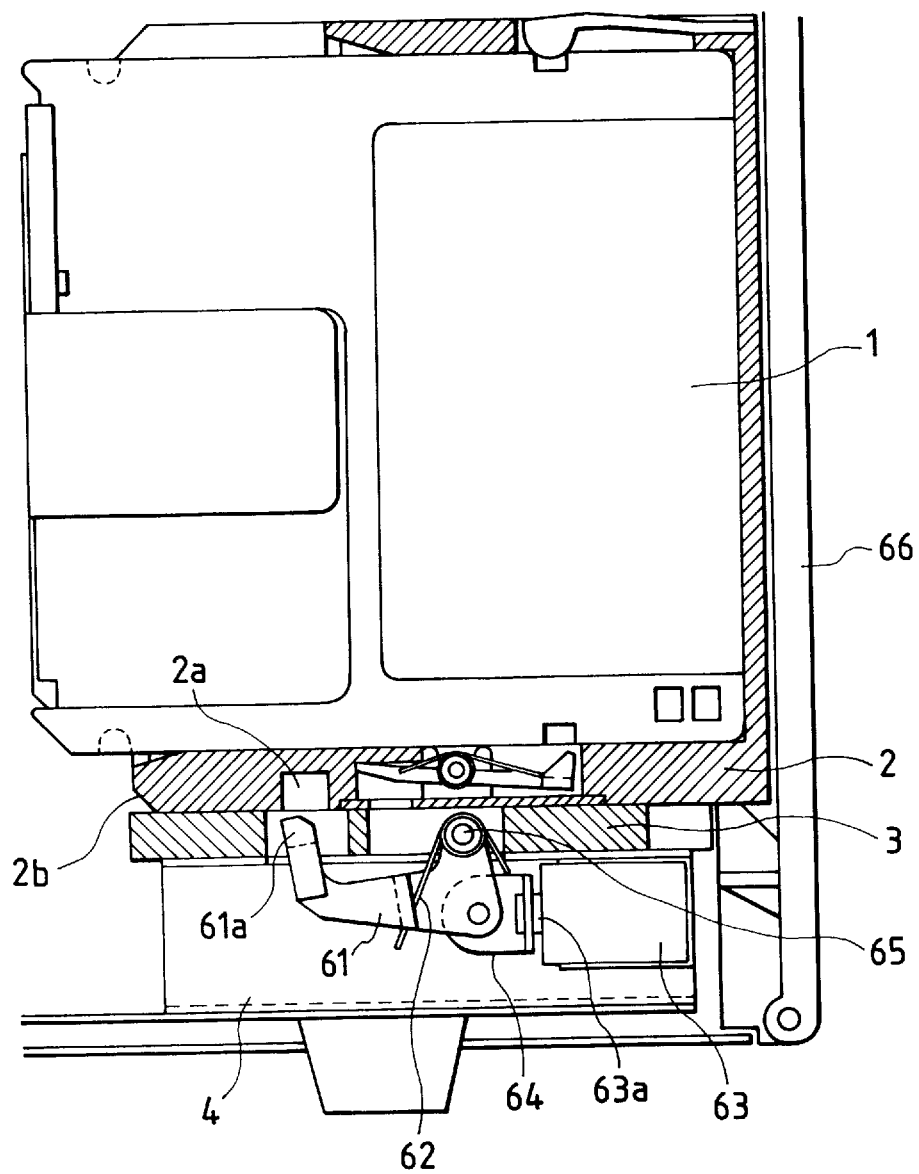
FIG. 9 is a side view showing portions of FIG. 4.

The lock mechanism of the magazine 2 will now be described with reference to FIGS. 4 and 9. FIG. 4 shows a state in which the magazine 2 has been locked, and FIG. 9 shows a state in which the magazine 2 has been unlocked. Reference numeral 61 denotes a lock lever supported for rotation about a rotary shaft 65 studded in the chassis 4. The lock lever 61 is biased clockwisely by a torsion spring 62. Reference numeral 63 designates a solenoid having its movable portion 63a connected to the lock lever 61 by a connecting plate 64. The tip end portion 61a of the lock lever 61 is normally fitted in the recess 2a of the magazine 2 by the biasing force of the torsion spring 62 to thereby lock the magazine 2.

Reference numeral 66 denotes an openable and closable lid provided on the front face of the auto-changer. The user opens this openable and closable lid 66 and inserts the magazine 2 from the front into a magazine loading port 67. The magazine 2, when forced in, depresses the tip end 61a of the lock lever 61 by the tapered portion 2b of the magazine 2 against the biasing force of the torsion spring 62, and moves until the tip end portion 61a fits into the recess 2a. In this position, the magazine 2 bears against a stopper (not shown) provided on the magazine base 3 and stops.

Even if in such a state as shown in FIG. 4, an attempt is made to pull out the magazine 2, the lock lever 61 rotates clockwisely, i.e., in a direction for its tip end portion 61a to enter into the recess 2a, and thus, the magazine 2 cannot be pulled out. When the solenoid 63 is electrically energized, the movable portion 63a thereof attracts the lock lever 61 toward the solenoid through the connecting plate 64 and therefore, the lock lever 61 is rotated counter-clockwisely to the position of FIG. 9. At this time, the tip end portion 61a of the lock lever 61 moves out of the recess 2a and therefore, the magazine 2 is unlocked. In this state, the user can pull the magazine 2 out of the auto-changer.

Usually, when the user wants to pull out the magazine, he operates, for example, a computer connected to the auto-changer and instructs the magazine to be unlocked by a command from the computer, whereby the magazine is unlocked. However, when it is inconvenient that the magazine is pulled out, for example, when the mechanism portion of the auto-changer is operating or when a cartridge contained in the magazine is in the drive apparatus or in the slot for a single cartridge, the unlocking of the magazine is inhibited and the magazine cannot be pulled out.

A stopper mechanism provided between the slot 50 for a single cartridge and the drive apparatus 5 will now be described with reference to FIGS. 2 and 3. Reference numeral 91 denotes a stopper movable along a guide pin 93 studded in a left chassis 92 substantially in parallelism to the guide rail 7. Since the groove portion 91a of the stopper 91 is fitted in a plate-like guide portion 94 provided on the magazine base 3, the stopper 91 does not rotate about the guide pin 93. Reference numeral 95 designates a compression spring which biases the stopper 91 in the direction of arrow in FIGS. 2 and 3.

Figure 1:
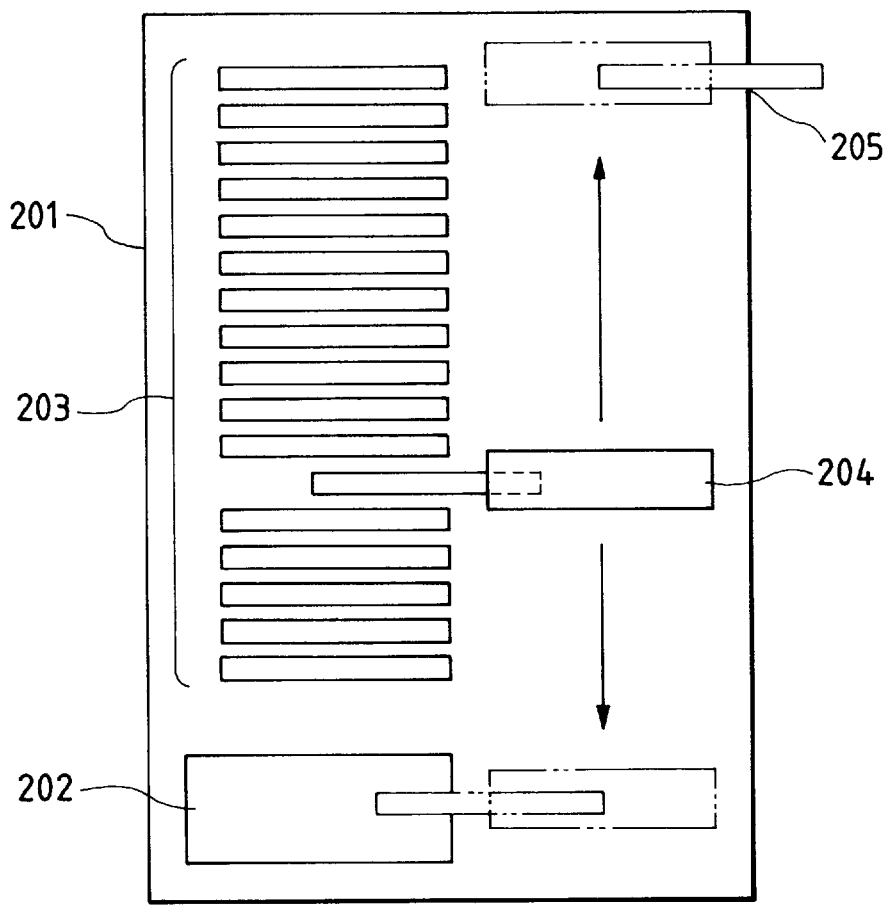
FIG. 1 is a view for illustrating an example of the prior art.
Figure 2:
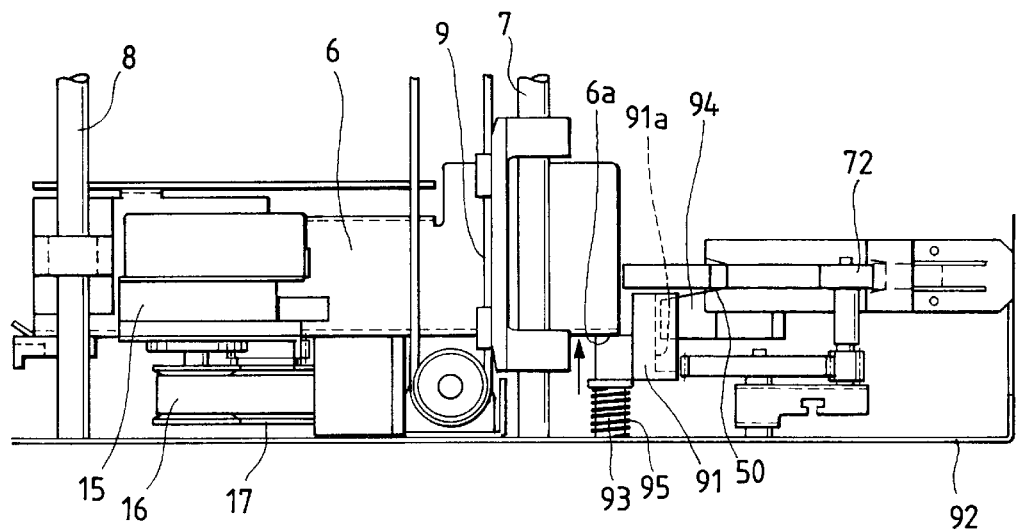
FIG. 2 is a side view of portions of an embodiment of the present invention.
Figure 3:
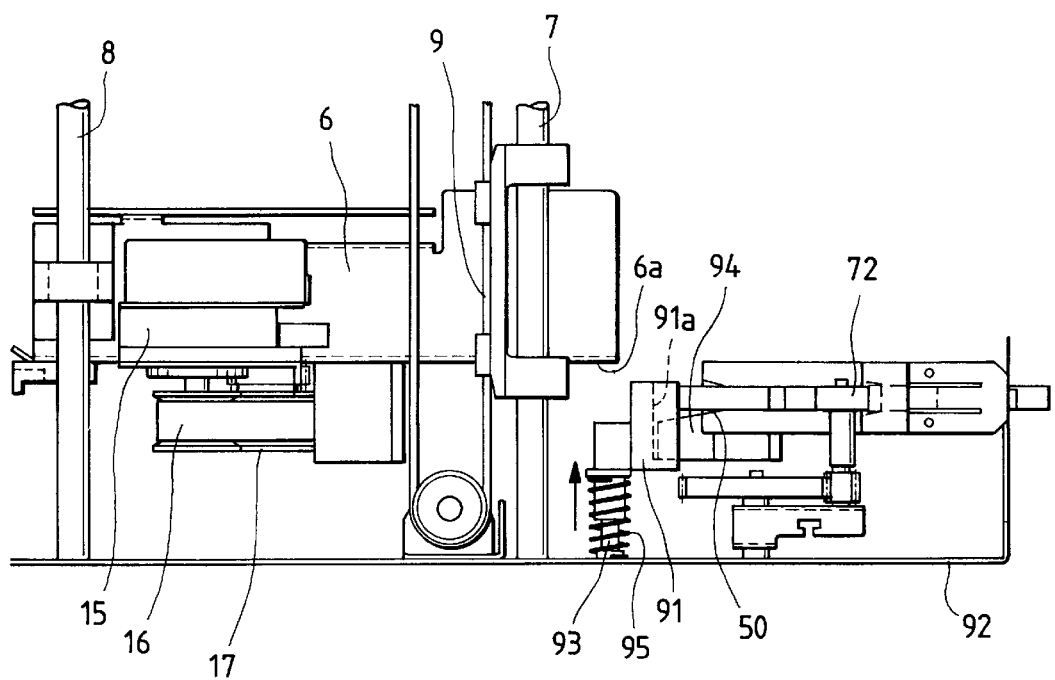
FIG. 3 is also a side view of portions of the embodiment in a state in which a stopper is working.

FIG. 2 shows a case where the cartridge loading port 5a of the drive apparatus 5 is at a position corresponding to the slot 50 for a single cartridge, and FIG. 3 shows a case where the drive apparatus is at another position.

In the state shown in FIG. 3, the stopper 91 is urged to a position in which it strikes against the guide portion 94, by the biasing force of the compression spring 95. Accordingly, even if the cartridge 1 is inserted through the slot 50 for a single cartridge, the cartridge cannot be forced in beyond the state shown in FIG. 3 wherein the leading end of the cartridge bears against the stopper 91.

Accordingly, even if the auto-changer is operating, the cartridge inserted through the slot 50 for a single cartridge will not have its movement hampered. However, the microswitch 83 in FIG. 8 detects that the cartridge has been inserted into the slot 50 for a single cartridge and therefore, the control unit (not shown) of the auto-changer terminates its operation left unfinished, whereafter it produces a command to convey the cartridge in the slot 50 into the drive apparatus. Until then, this cartridge waits in the slot 50.

When a preparation for receiving the cartridge inserted through the slot 50 for a single cartridge has been made on the auto-changer side, the drive apparatus is moved to a position shown in FIG. 2. At this time, the stopper bearing portion 6a of the drive holder 6 strikes against the stopper 91 and moves the stopper 91 to a position shown in FIG. 2 against the biasing force of the compression spring. When thereafter the feed rollers 71 and 72 are rotated, the cartridge in the slot 50 is conveyed toward the drive apparatus without being blocking by the stopper 91. The stopper can thus be retracted in conformity with the movement of the drive apparatus and therefore, no new means for the retraction of the stopper is necessary.

What is claimed is:

1. A cartridge auto-changer including:

a containing shelf containing a plurality of cartridges therein;

a recording-reproducing apparatus for effecting recording and/or reproduction on recording media in said cartridges;

a slot for loading said cartridges therethrough from the outside of said auto-changer into said auto-changer;

conveying means for conveying said cartridges between said containing shelf and said recording-reproducing apparatus and between said slot and said recording-reproducing apparatus, said conveying means being movable along said containing shelf;

stopping means for stopping a cartridge inserted through said slot on a conveyance route between said slot and a receiving position of said conveying means for said cartridges, wherein said stopping means includes a stopper adapted to be movable in a direction parallel to a moving direction of said conveying means and a direction perpendicular to an insertion direction of a cartridge into said slot; and biasing means for biasing said stopper to a position on the conveyance route for hampering movement of the cartridge inserted through said slot when said stopper is parallel moved in the same direction as the moving direction with a biasing force of said biasing means, wherein, when said conveying means is moved to a position corresponding to said slot, the bottom portion of the conveying means presses the stopper against the force of the biasing means and delivery of the cartridge inserted through said slot to said conveying means is permitted.

2. A cartridge auto-changer according to claim 1, wherein said recording-reproducing apparatus and said conveying means are moved as a unit in a direction of arrangement of said cartridges.

3. A cartridge auto-changer according to claim 1, wherein a conveying roller for conveying one of said cartridges between said slot and the cartridge receiving position of said conveying means is provided on the conveyance route, and said conveying roller and said conveying means have a common drive source.

* * * * *